No. 671,866. Patented Apr. 9, 1901.
J. McL. MURPHY.
ELECTRIC RAILWAY SYSTEM.
(Application filed Aug. 4, 1898.)
(No Model.)
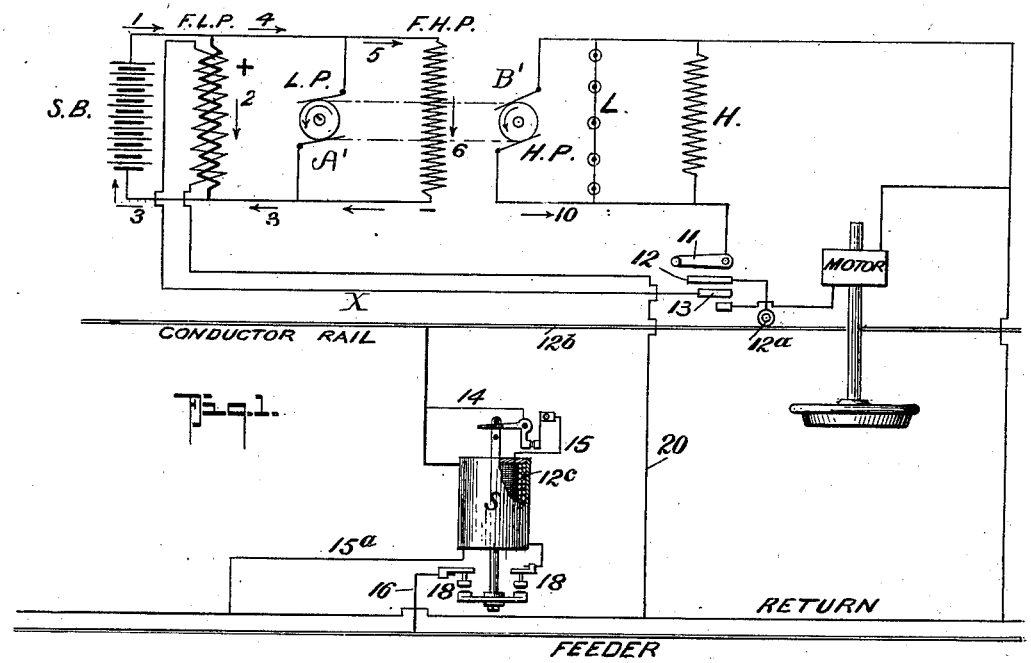
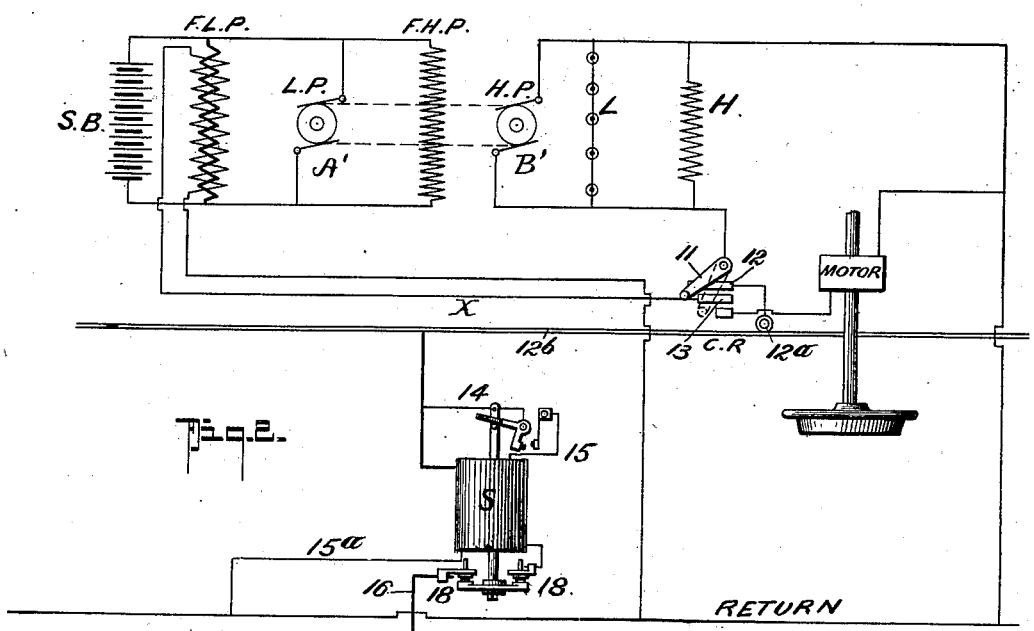
WITNESSES:
H. G. Dieterich
E. McCormic
INVENTOR
J. M. Murphy
BY
Fred G. Dieterich & Co.
ATTORNEYS

UNITED STATES PATENT OFFICE.

JOHN McLEOD MURPHY, OF TORRINGTON, CONNECTICUT, ASSIGNOR TO THE SAFETY THIRD RAIL ELECTRIC COMPANY OF NEW YORK, OF NEW YORK, N. Y.

ELECTRIC-RAILWAY SYSTEM.

SPECIFICATION forming part of Letters Patent No. 671,866, dated April 9, 1901.

Application filed August 4, 1898. Serial No. 687,726. (No model.)

*To all whom it may concern:*

Be it known that I, JOHN MCLEOD MURPHY, residing at Torrington, in the county of Litchfield and State of Connecticut, have invented certain new and useful Improvements in Electric-Railway Systems, of which the following is a specification.

This invention is in the nature of an improved rotary transformer or converter especially adapted for use in electric-railway systems in which the propelling-current is shunted by electromagnetic switch mechanisms into sectional conductors engaged by the trolley or pick-up carried on the car; and it has for its purpose to maintain an available electromotive force upon the car equal to that obtained from the main generator-current when it is connected to the car wherewith to operate the electromagnetic switches, as well as other devices—such as the lights, heaters, &c.—on the car at such times when the main-current-feeder wire is cut out from the car-circuits and to charge the storage batteries located on the car from the energy derived from the main circuit, wherewith the said main circuit is connected to the car, and to so operate that the same storage batteries will cause the rotary transformer to give an available electromotive force equal to that which was applied to it in the first instance. In the ordinary type of rotary transformers the ratio of transformation of the electromotive force between the two armatures is fixed—*i. e.*, if a certain motive force called A be applied to one armature A' of the transformer an induced electromotive force called B is thereby obtained at the other armature B' of the transformer. By reason of the electrical and mechanical losses the said ratio is not in direct proportion to the number of turns of the armatures at such times as current is flowing in the armature-coils. It therefore follows that if the electromotive force B is a given number of times that of A when A is the electromotive force of the driving or motor end of the transformer and B that of the generator end if an electromotive force from an external source equal to B be applied to armature B' in a reversed direction no current will flow through armature B' by reason of the two electromotive forces being equal and opposing one another. Therefore as armature B' will take no current it cannot drive the armatures and cannot generate current at the armature A' unless the source of current at A' is removed, in which case a current would be generated, but said current would be of less electromotive force than A and would therefore not be able to charge back the storage batteries which had previously driven the machine. Should it be desired with such a machine to generate a current of, say, five hundred volts (electromotive force) from a storage battery, say, of twenty volts, if five hundred volts were applied to the five-hundred-volt end there would be less than twenty volts generated at the low-potential end, a force not sufficient to charge the battery, for the reason that in order to charge the twenty-volt battery there is needed more than twenty volts to overcome the counter electromotive force of the batteries, which is greater when charging than when discharging.

The essential object of this invention is to provide a simple and positive means for changing the ratio of transformation of the two armatures, so that when the low-potential or battery end is being operated as a motor and taking current from the battery it will produce an electromotive force at the high-potential end of a certain value and that if a source of current having an electromotive force of this same value is applied to the high-potential end the ratio of transformation will be changed, so that the low-potential end will have an increased electromotive force to enable it to discharge back into the battery.

This invention also includes in its complete make-up certain features of construction and arrangement of parts, all of which will be fully described, and particularly pointed out in the claims, reference being had to the drawings, in which—

Figure 1 is a diagrammatic representation of my rotary transformer or converter, the several parts being adjusted to bring the low-potential armature in use as a motor and the high-potential armature as a generator, the controller being entirely open. Fig. 2 is a similar view, the parts being adjusted to bring the high-potential armature in use as a motor and the low-potential armature as a generator, the controller being shown in dotted lines in position for shunting the main or feed circuit to the motor, to the auxiliary winding, and to the high-potential armature.

Figs. 3 and 4 are views of modified arrangements of the transformer devices hereinafter specifically referred to.

In the accompanying drawings I have illustrated my improved transformer or converting means applied for use in connection with my switch mechanism patented February 22, 1898, No. 599,344; but I desire it understood that the use of the said transformer devices is not confined in its combination with the particular type of switch shown, as it may be used with other forms of electromagnetic switch devices involving a like generic principle.

Referring now to the drawings, S B designate a series of storage batteries, F L P the low-potential field-winding of the low-potential armature of the transformers, F H P the field-winding of the high-potential end, L P the low-potential armature, and H P the high-potential armature, all of which may be arranged in any well-known or approved manner.

11 indicates a controller of any well-known type located in the high-potential circuit of the transformer.

12 denotes the first contact for the controller, which is in circuit with the trolley $12^a$, which is shown in touch with one of the sections $12^b$ of the conductor or third rail.

The switch S, that connects the rail-section $12^b$ with the feeder-wire, has a low-resistance or heavy-wire winding $12^c$ and a high or fine-wire resistance coil 15, said high-resistance coil having a return or ground end $15^a$, as shown.

H indicates the heater, and L the lamps, all of which are in the high-potential circuit of the transformer.

Operation: Assuming the storage battery to be of ten cells, giving an electromotive force, say, of twenty volts, and it requiring an electromotive force of twenty-two volts to charge them or such excess voltage as is necessary to overcome their counter electromotive force during charging and assuming the said storage batteries as having been charged, a part of the current will then pass in the direction of 1, through the low-potential field-winding of the armature L P in the direction of 2, and thence back to the batteries. Another part of the current at the same time passes in the direction indicated by 4 to the armature L P and back in the direction indicated by 3 to the batteries, while still another part of the current passes by way 5 to the field-winding of the high-potential end and back in the direction of 6 3 to batteries. Armatures L P and H P in practice are mechanically joined to revolve in the same direction and speed, and when run by storage-battery energy the low-potential armature, acting as a motor, rotates the high-potential armature in the field of the high-potential field-magnet, thereby producing, as it were, an induced electromotive force in the high-potential armature in a direction and strength proportionate to its speed and windings, which in the present arrangement shown is assumably five hundred volts, thereby making available in the high-potential circuit a potential of five hundred volts for picking up the switches and maintaining the lights, heaters, and other electrically-energized devices carried on the car. Thus it will be seen that the high-potential circuit will be sufficient to maintain the lights, heaters, &c., on the car when the controller is shut off from the external or main-line source of energy and will also maintain sufficient electromotive force for picking up the switches to close in the main or feeder line with the sectional conductor or third rail. Now the parts being arranged as stated it will be apparent that the instant the controller-lever 11 is set to the position shown in dotted lines in Fig. 2 the induced high-potential circuit generated in the high-potential armature will serve to shunt the local or carried energy through the trolley $12^a$ to the sectional conductor $12^b$ to pick up or close in the switch, which when thus operated brings in the main-line feeder, and thereby allows a counter-current to flow from the main line through switch A into the high-potential circuit of the transformer, and assuming the voltage of the main line to be the same as the induced voltage of the high-potential circuit the electromotive force applied to the high-potential armature will then be in opposite direction and equal the induced electromotive force, and hence no current will pass, such condition continuing so long as the electromotive forces in the high-potential armature in opposite directions are alike. Now to change the above ratio I provide an auxiliary winding X, which is wound about the low-potential field of the armature L P or the field of the high-potential armature, or both, and connects with the external source of energy, one terminal thereof in the drawings being shown ending with the controller-contact 13 and the other with the ground or return, it being understood by reference to Fig. 2 that should the controller-lever 11 be set to the position shown in Fig. 2, the switch S being closed, the main or feeder current would pass into the auxiliary winding through lever 11 and contact 13. The turns of the auxiliary winding are so proportioned and connected in such direction that it will produce magnetizing force in the same direction as that caused by the field-winding F L P and in the reversed direction as that caused by the winding F H P. By connecting the auxiliary winding with the external energy, as stated, it is manifest that when the controller-lever 11 is moved to the second notch 13 or to the next notch to bring the motor into service a part of the external energy will at the same time pass into the auxiliary winding, which immediately produces a stronger magnetic field for armature L P, causing, as it were, a higher induction in armature L P and a weakening of the field of the armature H P, and thereby reduces the electromotive force of armature H P and permits it to rotate at an increased speed. This produces a higher electromotive force in the armature L P, which, becoming equal or superior to that of the electromotive force of the storage batteries, causes the said batteries to cease supplying current to the low-potential armature, which condition causes the armature H P, now under a direct electromotive force of five hundred volts, to rotate as a motor, changing the low-potential armature from a motor to a generator for recharging the storage batteries, this being made possible for the reason that the current now passing through winding X being of a strength sufficient to supply a magnetizing force, which, added to the normal force of the low-potential armature, will cause the said low-potential armature to generate an electromotive force greater than that which the batteries can supply, and thereby not only take no current from said batteries under such condition, but charge them. When the controller-lever 11 is shifted to the first notch or contact 12 the five-hundred-volts potential is available to actuate the switch S, the current then flowing as follows: Starting from armature H P in the direction of 10 to the lever 11, it passes to trolley 12$^a$, to rail 12$^b$, high-resistance wire lead 14, to winding 15 of switch S, to 15$^a$, to return or ground. This current picks up the switch, and as the switch closes the circuit in winding 15 is broken, the current then flowing from feeder-wire through contacts 18 18, back through the switch, through trolley 12$^a$, contact 12, and as the armature H P now acts as a generator the electromotive force thereof is equal to that received from the main line or feeder, and the current in the high-potential circuit of the transformer is rendered practically *nil*. By moving the lever 11 to contact 13 will cause the current to flow as follows: from the feeder-wire, through the switch S to the trolley, through contact 12 to lever 11, to contact 13, to winding X, and through return 20. This shunting of the main-line current into winding X increases the magnetizing force of field F L P, and as the low-potential armature will then act to generate a higher electromotive force than that produced by the batteries no current will go through it from the battery and the armature H P will then take current from the main or feeder wire to operate that end of the machine as a motor, the low-potential armature during this time recharging the batteries.

If desired, the car-motor can be in direct circuit with the contact 13; but I prefer to provide an additional notch or contact, so that the ratio of the two armatures may be governed when the motor is cut out. The results above described may also be obtained by placing the auxiliary winding X around the high-potential winding F H P, as shown in Fig. 3. In this case, however, the direction of the current in winding X will be such that its resultant magnetizing force will be opposed to that of the high-potential field-winding, and thereby reduce the total magnetism of the winding F H P and causing a lower counter electromotive force in the high-potential armature H P to allow it to take current from the five-hundred-volts potential and rotate the armature at a higher speed than that at which the current due to the electromotive force of the batteries rotated the two armatures, thereby causing armature L P to produce a higher electromotive force for charging the batteries, as before stated.

Both of the methods of applying the auxiliary winding may be combined, as illustrated in Fig. 4, by reference to which it will be seen that two windings (indicated by X X') are used, one for each field, the one, X, being arranged to impart increased electromotive force to the winding F L P, while the other, X', is arranged to proportionately decrease the electromotive force of the winding F H P.

Having thus described my invention, what I claim, and desire to secure by Letters Patent, is—

1. An electric-railway system, having an electromagnetic switch for shunting the feed-circuit and initially operated by a source of energy on the car, said source of energy comprising a rotary transformer having an auxiliary winding for the field-cores in circuit with the high-potential armature through the switch-controller for the purposes specified.

2. An electric-railway system having automatic circuit-shunting devices governed by a source of energy on the car, said source of energy including a rotary transformer having means for varying the magnetizing force for the armatures, said means being adapted to be brought in line with the main or feeder current when the controller is set to operate the shunting devices from the car-carried source of energy, for the purpose specified.

JOHN McLEOD MURPHY.

Witnesses:
 LOUIS STECKLER,
 WM. T. WOOD.